United States Patent [19]
Aso et al.

[11] Patent Number: 5,268,643
[45] Date of Patent: Dec. 7, 1993

[54] APPARATUS FOR FAILURE IDENTIFICATION FOR USE IN VEHICLE OCCUPANT PROTECTING SYSTEM

[75] Inventors: Makoto Aso, Anjo; Akira Kondo, Okazaki, both of Japan

[73] Assignee: Nippondenso Co., Ltd., Kariya, Japan

[21] Appl. No.: 849,453

[22] Filed: Mar. 11, 1992

[30] Foreign Application Priority Data

Mar. 14, 1991 [JP] Japan .................................. 3-74545

[51] Int. Cl.⁵ .......................................... G01M 19/00
[52] U.S. Cl. ................................... 324/502; 73/865.9
[58] Field of Search ..................... 73/118., 116, 865.9; 324/502; 307/10.1

[56] References Cited

U.S. PATENT DOCUMENTS

| | | | |
|---|---|---|---|
| 3,911,391 | 10/1975 | Held et al. | 340/524 |
| 4,893,109 | 1/1990 | Vrabel et al. | 340/438 |
| 4,968,965 | 11/1990 | Naitou et al. | 340/436 |
| 5,081,442 | 1/1992 | Ito et al. | 340/438 |
| 5,187,465 | 2/1993 | Stonerook et al. | 307/10.1 X |

Primary Examiner—Jerry W. Myracle
Attorney, Agent, or Firm—Cushman, Darby & Cushman

[57] ABSTRACT

An apparatus for failure identification suitable for determining between existence and nonexistence of failure of the squib in occupant protecting system. The first terminal voltage generated between both the terminals of the squib when the first monitor current is passed through the squib, and the second terminal voltage generated between both the terminals of the squib when the second monitor current is passed through the squib. The first and second terminal voltages are amplified by the differential amplifier circuit into the first and second differentially amplified voltage. Thereafter, the difference between the first differentially amplified voltage and the second differentially amplified voltage is calculated to obtain the monitor voltage difference and it is compared with the reference voltage, and thereupon, decision between existence and nonexistence of a short-circuit in the squib is made.

13 Claims, 4 Drawing Sheets

APPARATUS FOR FAILURE IDENTIFICATION FOR USE IN VEHICLE OCCUPANT PROTECTING SYSTEM

FIELD OF THE INVENTION

This invention relates to a vehicle occupant protecting system, more particularly, to an apparatus for failure identification that can determine positively whether an occupant protecting system is properly operating.

DESCRIPTION OF THE PRIOR ART

A conventional apparatus for identifying failure of vehicle occupant protecting system is disclosed for example in U.S. Pat. No. 3,911,391 in which the terminal voltage between both terminals of a squib, which is the term used wherein for the ignition element of an occupant protecting system is detected, the terminal voltage is differentially amplified by an operational amplifier, and the differentially amplified voltage is used for deciding between existence and nonexistence of a short-circuit in the squib. In performing differential amplification with the described arrangement using an operational amplifier, the offset voltage characteristic of the operational amplifier will be naturally mixed as error into the differentially amplified voltage. This leads to the possibility of an error being made in the result of decision between existence and nonexistence of a short-circuit.

SUMMARY OF THE INVENTION

Accordingly, an object of this invention is to provide an apparatus for failure identification for use in a vehicle occupant protecting system, in which, when deciding between presence and absence of a conduction failure in its starting element, the decision between presence and absence of a conduction failure in the starting element can be accurately made at all times independent of the offset voltage characteristic of the operational amplifier used as the circuit element.

To achieve the above mentioned object, the vehicle occupant protecting system of this invention of the type having a starting element starting upon receipt of a starting current from a power source and adapted such that the occupant is protected by the starting of the starting element, and comprises means for flowing a first monitor current from the power supply into the starting element to thereby cause the starting element to generate a first terminal voltage, means for flowing a second monitor current different from the first monitor current from the power supply into the starting element to thereby cause the starting element to generate a second terminal voltage, means including an operational amplifier for causing the operational amplifier to differentially amplify the first and second terminal voltages to thereby generate first and second differentially amplified voltages, means for calculating the difference between the first and second differentially amplified voltages, and decision means for deciding between existence and nonexistence of conduction failure in the starting element responding to the difference calculated by the calculation means.

DESCRIPTION OF THE PREFERRED EMBODIMENTS

Figure 1:
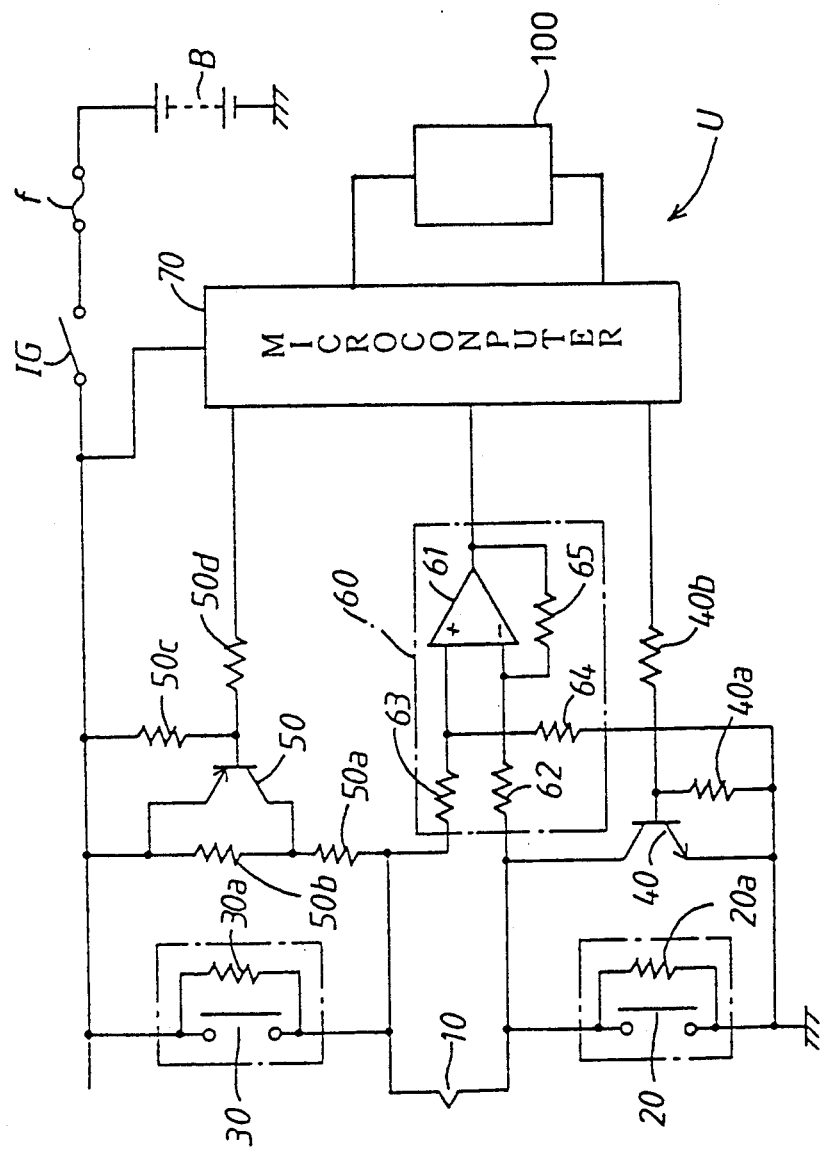
FIG. 1 is an electric circuit diagram schematically showing a first embodiment of this invention.

A first embodiment of this invention will be described below with reference to the drawings. FIG. 1 shows an example of a failure identification apparatus U according to this invention applied to a vehicle occupant protecting system. This occupant protecting system is adapted when actuated such that gas is generated from a gas generating source attached to the steering wheel of the vehicle in response to heat energy produced from a squib 10, when a current flowing into the squib 10 has increased to the level of a starting current and an air bag attached to the steering wheel is inflated with the generated gas to thereby protect the occupant. The internal resistance of the squib 10 is between 2Ω and 3Ω.

The occupant protecting system has a pair of normally open acceleration detection switches 20 and 30, of which the acceleration detection switch 20 is attached to a fender, usually the part over a tire, of the vehicle and adapted to close when the acceleration of the vehicle rises to a predetermined high acceleration level (100 G to 200 G for example). The acceleration detection switch 30 is installed in a suitable place inside the vehicle and adapted to close when the acceleration of the vehicle exceeds a predetermined low acceleration level (2 G for example). The acceleration detection switch 20 has its one terminal grounded and its other terminal connected with the positive terminal of a battery B through the squib 10 and acceleration detection switch 30 and, further, through the ignition switch IG of the vehicle and a fuse f.

The acceleration detection switch 20 is provided with a resistor 20a connected in parallel therewith and the acceleration detection switch 30 is provided with a resistor 30a connected in parallel therewith. The resistors 20a and 30a, in collaboration with later described resistors 50a and 50b, limit the current flowing from the battery B into the squib 10 to a very small current, called herein a testing current, small enough that it will not actuated the squib. This current has a magnitude much smaller than the starting current but large enough to allow a determination between existence or nonexistence of a short-circuit in the squib 10. Therefore, this operates as a monitor current. The resistance values of the resistors 20a and 30a are set to be considerably larger than the internal resistance value of the squib 10.

The failure identification circuit U includes a transistor 40 which has its emitter grounded and its collector connected with the positive terminal of the battery B through the squib 10, the parallel circuit of the acceleration detection switch 30 and the resistor 30a, the ignition switch IG, and the fuse f. The transistor 40 serves as a switching element that is selectively turned on by the biasing action of resistors 40a and 40b providing a bias to its base under the control of the later described microcomputer 70.

The transistor 50 has its emitter connected with the positive terminal of the battery B through the ignition switch IG and the fuse f and its collector connected through a resistor 50a, the squib 10, and the parallel circuit of the acceleration detection switch 20 and the resistor 20a finally to ground. Resistor 50b is connected between the collector and emitter of the transistor 50. The transistor 50 is as a switching element selectively turned on by biasing action of resistors 50c and 60d providing a bias to its base under the control of the later described microcomputer 70.

A differential amplifier circuit 60 has an operational amplifier 61, with an inverting input terminal that is connected with the common terminal of the squib 10, the high value resistor 20a, and the collector of the transistor 40 through an input resistor 62 of the operational amplifier 61. The noninverting input terminal of the operational amplifier 61 is connected with the common terminal of the squib 10 and the resistor 50a through an input resistor 63. Another input resistor 64 has its one end connected with the noninverting input terminal of the operational amplifier 61 and its other end grounded.

A feedback resistor 65 is connected between the inverting terminal and the output terminal of the operational amplifier 61. The differential amplifier circuit 60 differentially amplifies the terminal voltage generated between both the terminals of the squib 10 through the differential amplification action provided by the operational amplifier 61 collaborating with both the input resistors 62 and 63 and the feedback resistor 65. The result of the differential amplification is output from the output terminal of the operational amplifier 61 as a differentially amplified voltage. The sum of both the resistors 63 and 64 are set to be considerably higher than the resistance value of the resistor 20a.

Figure 2A:
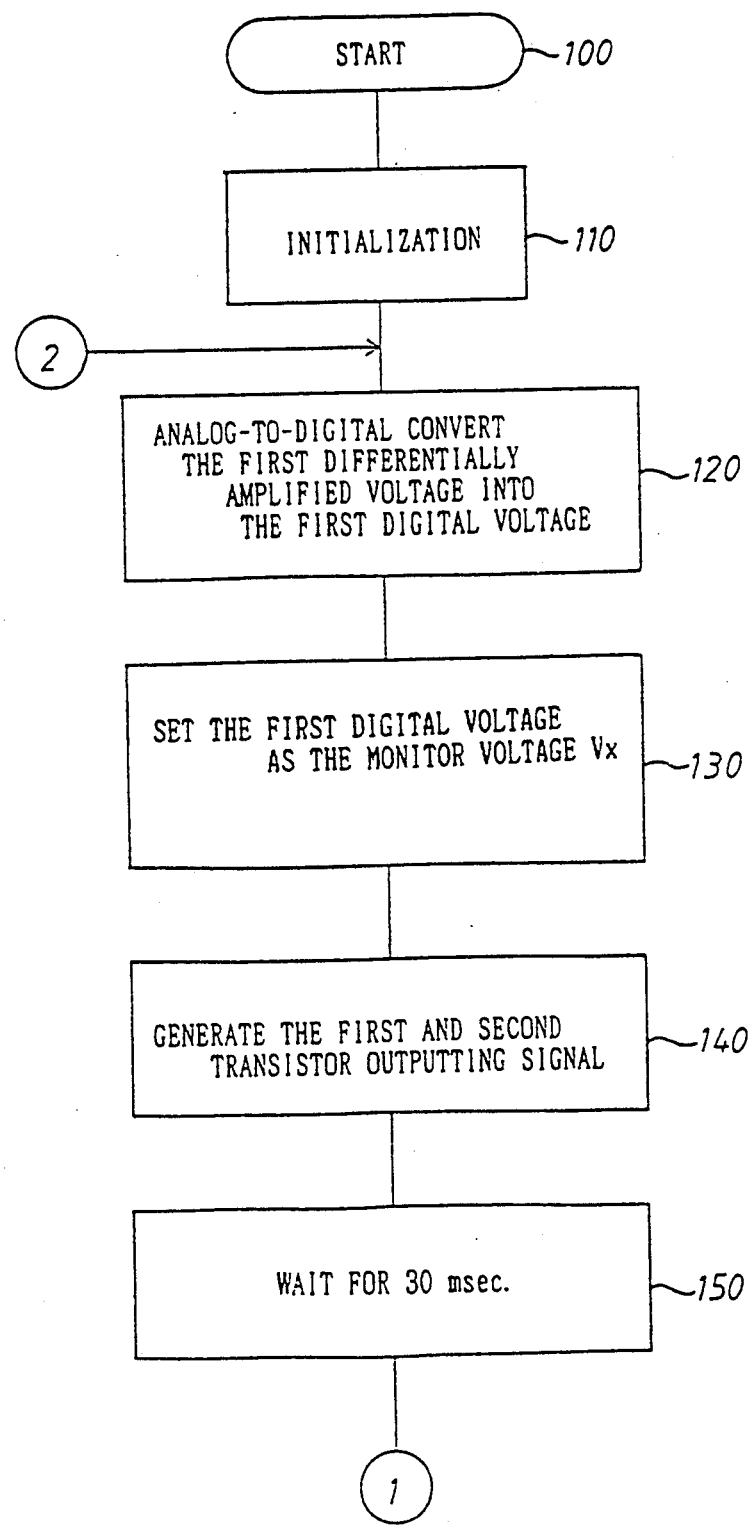
FIG. 2a is the first part of a flow chart showing operations of the microcomputer in FIG. 1
Figure 2B:
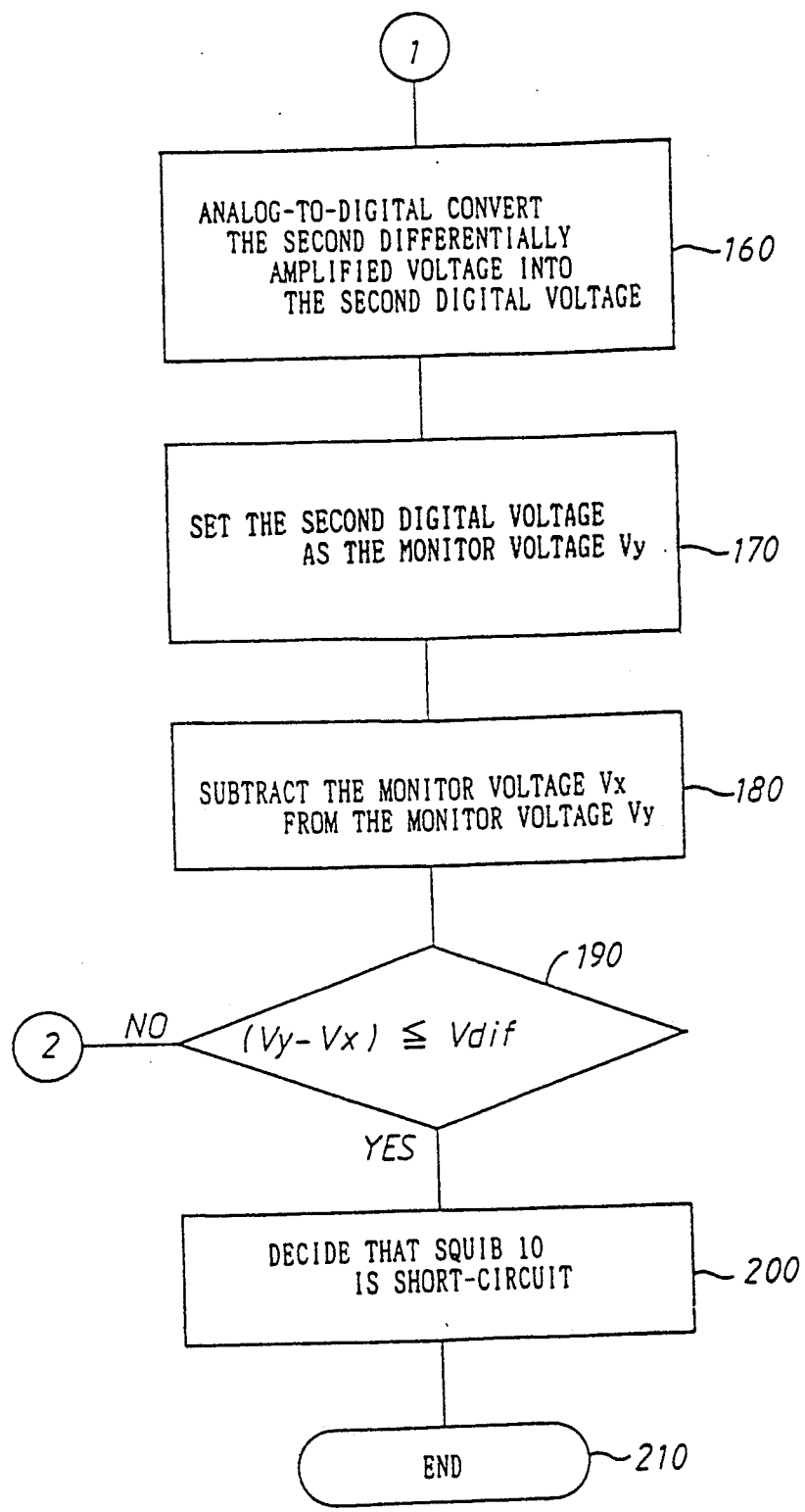
FIG. 2b is the last part of the same.

The microcomputer 70, in collaboration with the differential amplifier circuit 60, executes a computer program according to the flow charts shown FIG. 2a and FIG. 2b, and in the course of the execution, performs necessary processing for controlling conduction of both the transistors 40 and 50 and decision between an existence and nonexistence of a short-circuit in the squib 10. The computer program is previously stored in the ROM of the microcomputer 70. The microcomputer 70 is adapted to be operated with a DC voltage supplied from the positive terminal of the battery B through the ignition switch IG and fuse f.

In the first embodiment arranged as described above, when the ignition switch IG is closed, the microcomputer 70 is supplied with the DC voltage from the battery B to be activated, and the microcomputer 70 starts the execution of the computer program according to the flow charts of FIG. 2a and FIG. 2b in step 110, which is an initialization step. At this point, it is assumed that electric circuit elements such as the acceleration detection switches 20 and 30 and the squib 10 as well as the various circuit elements shown in FIG. 1 required for decision about failures in the occupant protecting system are all in their normal state. Accordingly, in the current stage, the vehicle being stopped, the acceleration detection switches 20 and 30 are both in their open state and the transistors 40 and 50 are both in their off state.

Under the conditions as described above, DC current from the battery B flows as a first monitor current through the series connection of a) the parallel circuit of the resistor 30a and the series circuit of the resistors 50a 50b, b) the squib 10, and c) the resistor 20a. Thereby, a terminal voltage proportional to the first monitor current flowing into the squib 10 is generated between both the terminals 10a and 10b of the squib 10. The operational amplifier 61 of the differential amplifier circuit 60, receives the terminal voltages of the squib 10 as test voltage through the resistors 62 and 63 and differentially amplifies the terminal voltage under the feedback action of the feedback resistor 65 and outputs the same as a differentially amplified voltage, hereinafter referred to as "first differentially amplified voltage".

When the initialization in the step 110 is completed, the microcomputer 70 analog-to-digital converts the first differentially amplified voltage obtained from the operational amplifier 61 into a first digital voltage in step 120 and sets the first digital voltage as a monitor voltage Vx in step 130. The microcomputer 70 generates a first and a second transistor outputting signal required for turning on the transistors 40 and 50, respectively, in step 140, and waits until 30 msec. elapses in step 150.

As the first and second transistor outputting signals are generated from the microcomputer 70 as described above, the transistor 40, responding to the first transistor outputting signal, is turned on biased by the resistors 40b and 40a to thereby short-circuit the resistor 20a. Meanwhile, the transistor 50, responding to the second transistor outputting signal from the microcomputer 70, is turned on biased by the resistors 50d and 50c to thereby short-circuit the resistor 50b. In these cases, since a period of time is allowed for waiting in the step 150, it is assured that the full on state of the transistors 40 and 50 has been reached.

Consequently, DC current from the battery B flows as a second monitor current through the parallel circuit of the resistor 30a and the resistor 50a, the squib 10, finally through the transistor 40 to ground. Accordingly, a terminal voltage proportional to the second monitor current flowing into the squib 10 is generated between both terminals of the squib 10. Then, in the differential amplifier circuit 60, the operational amplifier 61 receives the terminal voltage of the squib 10 through the resistors 62 and 63 and performs differential amplification of the terminal voltage under the feedback action of the feedback resistor 65 and outputs the same as another differentially amplified voltage hereinafter referred to as "second differentially amplified voltage". After the waiting time is elapsed in the step 150, the microcomputer 70 analog-to-digital converts the second differentially amplified voltage into a second digital voltage in step 160 (FIG. 2b) and sets the second digital voltage as a monitor voltage Vy in step 170.

Then, the microcomputer 70, in the following step 180, subtracts the monitor voltage Vx set in the step 130 from the monitor voltage Vy set in the step 170, and advances the computer program to step 190, wherein it compares the monitor voltage difference (Vy−Vx) with a reference voltage Vdif. Here, the reference voltage Vdif, which is set to a smaller voltage value than the internal resistance of the squib 10 so as to be used for determining whether or not the squib 10 is short-circuited, is stored in advance in the ROM of the microcomputer 70. In this case, since the squib 10 is in its normal state as described above, (Vy−Vx)>Vdif holds. Hence, the microcomputer 70 gives the decision "NO" in the step 190 and returns the computer program to the step 120.

On the other hand, if the squib 10 is short-circuited at the time of decision of the step 190, (Vy−Vx)≦Vdif holds. Hence, the microcomputer 70 gives the decision "YES" in the step 190, and determines, in step 200, that the squib 10 is short-circuited and stops the execution of the computer program in step 210.

As described in the foregoing, in deciding between presence and absence of a short-circuit in the squib 10, first, the terminal voltage generated between both the terminals of the squib 10 when the first monitor current is passed through the squib 10 with both of the transistors 40 and 50 turned off is differentially amplified by the differential amplifier circuit 60 into the first differentially amplified voltage and this first differentially amplified voltage, after being converted into the first digital voltage, is set up as the monitor voltage Vx. Then, the terminal voltage generated between both the terminals of the squib 10 when the second monitor current is passed through the squib 10, with both of the transistors 40 and 50 turned on and, hence, both of the resistors 20a and 50b short-circuited, is differentially amplified by the differential amplifier circuit 60 into the second differentially amplified voltage and this second differentially amplified voltage, after being converted into the second digital voltage, is set up as the monitor voltage Vy. Thereafter, the difference between the monitor voltage Vy and monitor voltage Vx is calculated to obtain the monitor voltage difference (Vy−Vx) Which is compared with the reference voltage Vdif, and thereupon, decision between existence and nonexistence of a short-circuit in the squib 10 is made.

Since any offset voltage characteristic of the operational amplifier 61 is equally included in both the first and second differentially amplified voltages, i.e., it is equally included in the monitor voltages Vx and Vy. Therefore, the offset voltage is canceled when the monitor voltage difference (Vy−Vx) is calculated, and as a result, the monitor voltage difference (Vy−Vx) can be determined as a value not including the offset voltage. Accordingly, the comparison between the monitor voltage difference (Vy−Vx) and the reference voltage Vdif can be accurately performed at all times not effected by the offset voltage characteristic of the operational amplifier 61. Further, since a period of time is allowed for waiting in the step 150 as described above, the monitor voltage difference (Vy−Vx) can be obtained after the change from the first monitor current to the second monitor current has been made for certain. Therefore, the decision about existence of the short-circuit in the squib 10 can be made more reliably.

Now, a second embodiment of this invention will be described with reference to FIG. 3. This second embodiment further includes addition of a backup power supplying apparatus 80 to the battery B of the occupant protecting system described in the first embodiment and employment of a failure identification apparatus Ua in place of the failure identification apparatus U described in the first embodiment. Apparatus Ua includes a positive voltage supply to maintain the position input of its operational amplifier at a positive voltage to maintain its output also at a positive voltage. The backup power supply apparatus 80 has a backup capacitor 81, the backup capacitor having its one end grounded and the other end connected with the positive terminal of the battery B through a resistor 82, the ignition switch IG, and the fuse f. A diode 83 for blocking reverse current is also proved.

The backup capacitor 81 is supplied with a DC voltage from the battery B through the fuse f, ignition switch IG, and resistor 82 to be charged and generates a backup voltage. When the connecting lead of the battery B is broken, the occupant protecting system protects the occupant the same as in the first embodiment by responding to a starting current flowing into the squib 10 depending on the backup voltage from the backup capacitor 81.

The failure identification apparatus Ua, as compared will the configuration of the failure identification apparatus U described in the first embodiment, does not include the resistor 50b connected between the emitter and collector of the transistor 50, whereby the emitter and collector are disconnected. It has an additional resistor 40c connected between the collector of the transistor 40 and the common terminal of the squib 10 and the input resistor 62. The function of transistor 40 in the second embodiment is different from the first embodiment:

In the first embodiment, an electric acceleration sensor 100 is provided in addition to the acceleration detection switches 20 and 30. Microcomputer 70 controls the transistor 40 to actuate squib 10 in response to a signal indicative of vehicle collision from the electric acceleration sensor 100.

That is, transistor 40 in the first embodiment has two functions of flowing the monitor current into squib 10 and of actuating the squib 10 when microcomputer 10 has determined the vehicle collision.

Over against this, transistor 40 in the second embodiment has only one function of flowing the monitor current into squib 10. It also has a transistor circuit 90 to the differential amplifier circuit 60 therein. The transistor circuit 90 includes a pair of resistors 91 and 92 and an operational amplifier 93 which is configured as a voltage follower. The resistor 91 has its one end grounded and the other end connected with the positive terminal of the battery B through the resistor 92, ignition switch IG, and fuse f. The resistors 91 and 92 divide the DC voltage from the battery B through the fuse f and ignition switch IG or the backup voltage from the backup power supply 80 and generate a divided a positive DC voltage at their common terminal. The preferred out put voltage is 1 volt, which is sufficient so that the squib will never fire from this voltage.

The operational amplifier 93 has its noninverting input terminal connected with the common terminal of the resistors 91 and 92 and its inverting terminal and output terminal connected with the noninverting input terminal of the operational amplifier 61 through the resistor 64 of the differential amplifier circuit 60. The operational amplifier 93 receives the divided voltage from the common terminal of the resistors 91 and 92 and supplies the same to the noninverting input terminal of the operational amplifier 61 through the resistor 64. This means that the noninverting input terminal of the operational amplifier 61 is maintained at positive potential by the positive DC voltage from the transistor circuit 90 at all times. The positive voltage is a voltage high enough to maintain its output voltage always at a positive value. Otherwise, the configuration is the same as that of the first embodiment.

Figure 3:
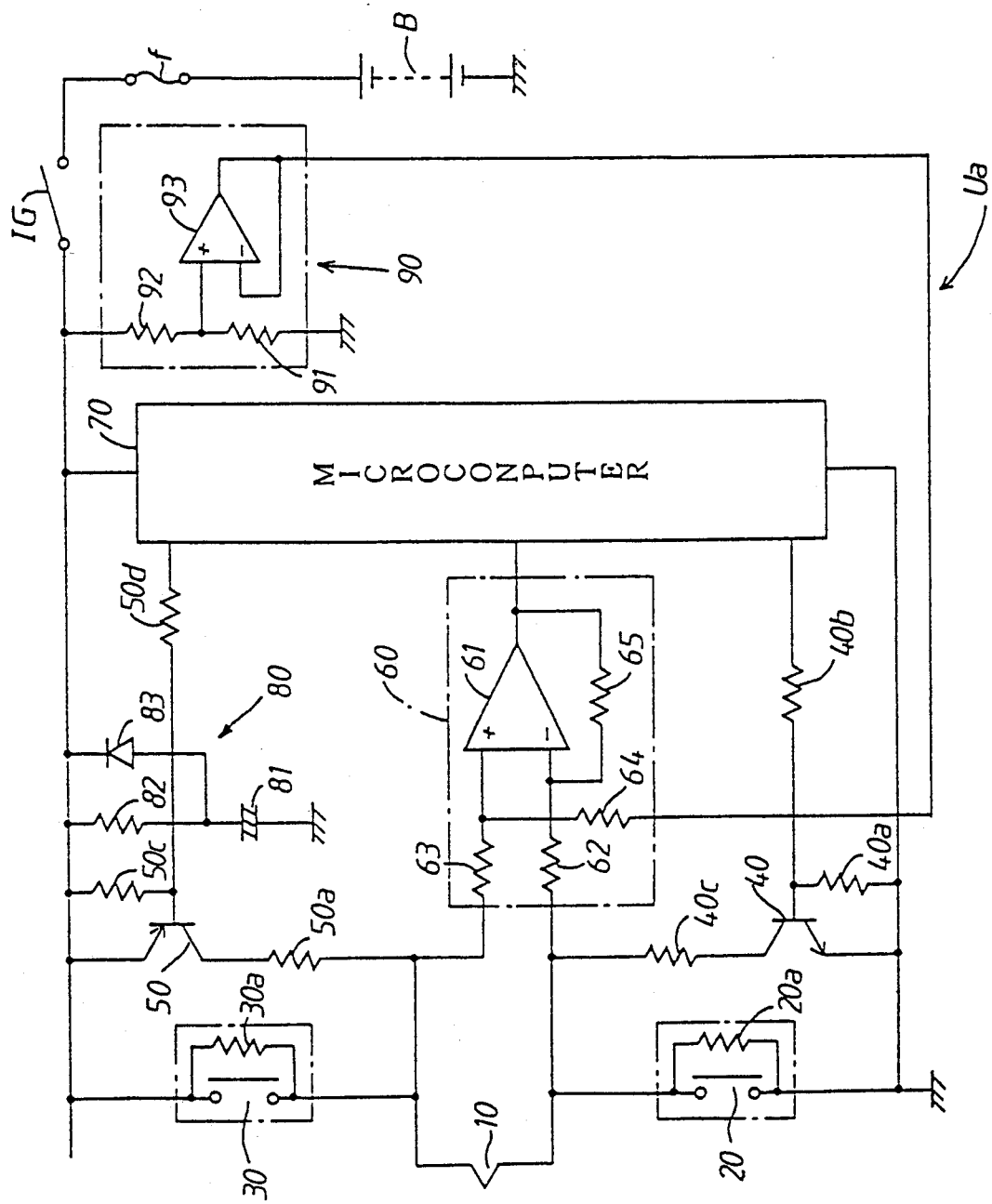
FIG. 3 is an electric circuit diagram showing a second embodiment of this invention.

In the second embodiment arranged as described above, electric circuit elements of the occupant protecting system and circuit elements required for decision about failures in the system shown in FIG. 3 are assumed to be in their normal state. Accordingly, in the current stage, the vehicle being stopped, the acceleration detection switches 20 and 30 are both considered to be in their open state and the transistors 40 and 50 are both considered to be in their off state. Under the described conditions, the ignition switch IG is closed. Then, as in the first embodiment, the DC current from the battery B flows as the first monitor current through the fuse f, resistor 30a, squib 10, and resistor 20a. Therefore, a terminal voltage is generated proportional to the first monitor current flowing into the squib 10 between both terminals of the squib 10.

Further, the transistor circuit 90 receives the DC voltage from the battery B through the fuse f and the ignition switch IG and generates a positive divided voltage and supplies the same to the noninverting input terminal of the operational amplifier 61 through the resistor 64. Thereby, the noninverting input terminal of the operational amplifier 61 is always maintained at positive potential due to the positive divided voltage from the transistor circuit 90. Accordingly, in the differential amplifier circuit 60, the operational amplifier 61 receives the terminal voltage of the squib 10 through the resistors 62 and 63, under the state of the operational amplifier 61 having its noninverting input terminal maintained at positive potential, and differentially amplifies the terminal voltage under the feedback action of the feedback resistor 65, the same as in the first embodiment, and generates the differentially amplified voltage (hereinafter referred to as "first differentially amplified voltage"). In this case, since the noninverting input terminal of the operational amplifier 61 is maintained at positive potential no matter whether the offset voltage of the operational amplifier 61 is positive or negative, the first differentially amplified voltage from the operational amplifier 61 is never made negative but always maintained to be positive.

The same as in the first embodiment, as the first and second transistor outputting signals are generated from the microcomputer 70, the transistor 40, responding to the first transistor outputting signal, is turned on biased by the resistors 40b and 40a to thereby short-circuit the resistor 20a. On the other hand, the transistor 50, responding to the second transistor outputting signal from the microcomputer 70, is turned on biased by the resistors 50d and 50c. Consequently, the DC current from the battery B flows as the second monitor current through the parallel circuit of the resistor 30a and resistor 50a, the squib 10, and the parallel circuit of the resistors 20a and 40c. As a result, virtually the same as in the first embodiment, a terminal voltage is generated proportional to the second monitor current flowing into the squib 10 between the terminals of the squib 10.

Then, in the differential amplifier circuit 60, the operational amplifier 61 receives the terminal voltage of the squib 10 through the resistors 62 and 63, under the state of the operational amplifier 61 having its noninverting input terminal maintained at positive potential the same as in the above described case, and differentially amplifies the terminal voltage under the feedback action of the feedback resistor 65, and generates the differentially amplified voltage (hereinafter referred to as "second differentially amplified voltage"). In this case, since the noninverting input terminal of the operational amplifier 61 is maintained at positive potential as described above no matter whether the offset voltage of the operational amplifier 61 is of the same polarity as that of the offset voltage at the time of generation of the first differentially amplified voltage, the second differentially amplified voltage from the operational amplifier 61 is maintained to be positive the same as the first differentially amplified voltage.

Since, as described above, the first and second differentially amplified voltages are maintained to be positive at all times regardless of fluctuations of the polarity of the offset voltages of the operational amplifier 61, the analog-to-digital conversion of the first and second differentially amplified voltages by the microcomputer 70 in the steps 120 and 160, hence setting up of the monitor voltages Vx and Vy by the microcomputer 70 in the steps 130 and 170, can be correctly performed at all times and can have better resolution due to the smaller necessary range. Therefore, the same as in the first embodiment, in performing the calculation of the monitor voltage difference (Vy−Vx) in the step 180, the calculation is correctly performed at all times not effected by the fluctuations between positive and negative polarities of the offset voltage of the operational amplifier 61.

As a consequence of the foregoing, an accurate determination can be made in the step 190 not effected by the fluctuations between positive and negative polarities of the operational amplifier 61 and erroneous decision about existence of a short-circuit in the squib 10 can be prevented from being made. In other words, since the fluctuations of the polarities of the output of the operational amplifier 61 due to fluctuations of the polarities of the offset voltage of the operational amplifier 61 are prevented by the arrangement of the transistor circuit 90 for maintaining the noninverting input terminal of the operational amplifier 61 at positive potential, the accuracy in the decision about existence of a short-circuit in the squib 10 can be further improved. The above described performance and effects can be equally obtained even if the backup voltage from the backup power supply 80 is used. Other performances and effects obtained from this embodiment are the same as those obtained from the first embodiment.

In executing this invention, the invention may also be applied to an occupant protecting system attached to the seat belt of the vehicle.

In the second embodiment, although the cases where the transistor circuit 90 is employed for maintaining the noninverting input terminal of the operational amplifier 61 at positive potential has been described, the embodiment may be modified so as to employ, instead of the transistor circuit 90, DC power supply outputting the same positive DC voltage as that output from the transistor circuit 90. Of course, the first embodiment can include a similar battery back up to the one in the second embodiment and could of course use the different resistor layout of the second embodiment.

In the above described embodiments, although the case where existence of a short-circuit in the squib 10 is determined has been described, the embodiment is not limited to such case but applicable to the case where existence of poor conduction, such as insufficient conduction, of the squib 10 is to be determined.

What is claimed is:

1. An apparatus for failure identification for use in a vehicle occupant protecting system comprising:
   squib circuit means for activaying said occupant protecting system when supplied with a starting current;
   means for supplying said squib means with first aid second dissimilar monitor currents both smaller than said starting current, to cause
   said squib means to generate at two test voltages respectively;
   means, including an operational amplifier, for differentially amplifying
   said test voltages, and generating first and second amplified voltages indicative thereof;

means for calculating a difference between said first and second amplified voltages; and means for identifying a failure of said squib means on the basis of said difference.

2. An apparatus for failure identification for use in a vehicle occupant protecting system according to claim 1, wherein said supplying means comprising:

first means for supplying said squib means with said first monitor current from a power supply, and making said squib means to generate a first test voltage; and second means for supplying said squib means with said second monitor current from said power supply, and making said squib means to generate a second test voltage.

3. An apparatus for failure identification for use in a vehicle occupant protecting system according to claim 2, wherein said first means includes waiting means for waiting for a certain time after said first means has finished supplying with said first monitor current, and said second means supplies said squib means with said second monitor current from said power supply after said certain time.

4. An apparatus for failure identification for use in a vehicle occupant protecting system according to claim 1, wherein said supplying means comprising:

means for generating a monitor current from said power supply;

means for varying said monitor current, and generating said first and second monitor currents; and means for making said squib means to generate a first and second test voltages when said varying means supplies said squib means with said first and second monitor currents.

5. An apparatus for failure identification for use in a vehicle occupant protecting system according to claim 4, wherein said varying means comprising:

means for producing said first and second monitor currents by varying said monitor current;

means for supplying said squib means with said first monitor current or said second monitor current; and means for waiting for a certain time from supplying with said first monitor current to supplying with said second monitor current.

6. An apparatus for failure identification for use in a vehicle occupant protecting system according to claim 1, wherein said amplifying means comprises positive voltage supplying means for supplying a noninverting input terminal of said operational amplifier with a positive direct current.

7. An apparatus for failure identification for use in a vehicle occupant protecting system according to claim 1, wherein said identifying means comprises:

means for storing a reference voltage set to a smaller voltage value than a value corresponding to an internal resistance of said squib means; and means for determining failure of said squib means, wherein said determining means determines failure if said difference voltage is not smaller than said reference voltage.

8. An apparatus for failure identification for use in a vehicle occupant protecting system comprising:

squib means for activating said occupant protecting system when supplied with a starting current;

first means for supplying said squib means with a first monitor current smaller than said starting current, to cause said squib means to generate a first test voltage;

second means for supplying said squib means with a second monitor current smaller than said starting current, to cause said squib means to generate a second test voltage;

means, including an operational amplifier that has an inherent offset voltage, for differentially amplifying said test voltages, and generating first and second amplified voltages indicative thereof;

means for detecting a difference voltage by subtracting said first amplified voltage from said second amplified voltage to cancel said offset voltage; and means for identifying failure of said squib means on the basis of said difference voltage.

9. An apparatus for failure identification for use in a vehicle occupant protecting system according to claim 8, wherein said first means includes waiting means for waiting for a certain time after said first means has finished supplying said first monitor current, and said second means supplies said squib means with said second monitor current from said power supply after said certain time.

10. An apparatus for failure identification for use in a vehicle occupant protecting system according to claim 8, wherein said identifying means comprises:

means for storing a reference voltage which is set to a smaller voltage value than a value corresponding to an internal resistance of said squib means; and means for determining failure of said squib means if said difference voltage is not smaller than said reference voltage.

11. An apparatus for determining a measure indicative of proper operation of an ignition element for an occupant protecting system comprising:

a squib element, having two terminals, means for supplying said squib element with two different test currents at different times, both less than an amount of current necessary to activate said squib element; so that said squib element produces a voltage at said two terminals;

means for differentially amplifying said voltage at said two terminals at said different times, to produce differential voltages which each include an offset voltage of said amplifying means; and means for subtracting one of said differential voltages from the other, to produce a value independent said offset voltage.

12. An apparatus for determining a measure indicative of proper operation of an ignition element for an occupant protecting system according to claim 11, said subtracting means comprises determining means for determining failure of said squib element on the basis of said value.

13. A method of determining failure of a vehicle occupant protecting system, comprising the steps of:

supplying a squib element with a first monitor current smaller than a starting current which can activate said squib element, to cause said squib element to generate first test voltage, at different test points thereof;

supplying said squib element with a second monitor current smaller than said starting current, to cause said squib element to generate second test voltage, at different test points thereof;

differentially amplifying said first test voltages and said second test voltages, using an amplifier which has an inherent offset voltage, to generate first and second differential voltages indicative thereof;

detecting a difference voltage by subtracting said first differential voltage from said second differential voltage; and determining failure of said squib element on the basis of said differential voltage.

* * * * *